United States Patent
Chauhan

(10) Patent No.: US 8,521,909 B2
(45) Date of Patent: *Aug. 27, 2013

(54) INFERRING SERVER STATE IN A STATELESS COMMUNICATION PROTOCOL

(75) Inventor: Abhishek Chauhan, Los Gatos, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/240,998

(22) Filed: Sep. 22, 2011

(65) Prior Publication Data

US 2012/0017010 A1    Jan. 19, 2012

Related U.S. Application Data

(63) Continuation of application No. 10/877,362, filed on Jun. 25, 2004, now Pat. No. 8,051,207.

(51) Int. Cl.
    *G06F 15/16*     (2006.01)
(52) U.S. Cl.
    USPC ................. 709/247; 709/246; 709/203
(58) Field of Classification Search
    USPC .................... 709/246–247, 203, 230
    See application file for complete search history.

(56) References Cited

U.S. PATENT DOCUMENTS

| | | | |
|---|---|---|---|
| 5,491,750 A | 2/1996 | Bellare et al. | |
| 5,956,407 A | 9/1999 | Slavin | |
| 5,982,934 A | 11/1999 | Villalba | |
| 6,154,775 A | 11/2000 | Coss et al. | |
| 6,300,947 B1 | 10/2001 | Kanevsky | |
| 6,345,307 B1 | 2/2002 | Booth | |
| 6,496,824 B1 | 12/2002 | Wilf | |
| 6,850,252 B1 | 2/2005 | Hoffberg | |
| 6,906,719 B2 | 6/2005 | Chadha et al. | |
| 7,043,608 B2 | 5/2006 | Sun | |
| 2002/0073232 A1* | 6/2002 | Hong et al. | 709/238 |
| 2003/0105805 A1 | 6/2003 | Jorgenson | |
| 2003/0177187 A1 | 9/2003 | Levine et al. | |
| 2004/0071368 A1* | 4/2004 | Chadha et al. | 382/305 |
| 2004/0249793 A1 | 12/2004 | Both | |
| 2005/0097217 A1* | 5/2005 | Val et al. | 709/233 |

FOREIGN PATENT DOCUMENTS

| | | |
|---|---|---|
| EP | 0 405 215 | 8/1996 |
| EP | 0 851 628 A1 | 7/1998 |

OTHER PUBLICATIONS

Indian Examination Report on 3804/KOLNP/2006 dated Dec. 10, 2012.

Dave Otway and Owen Rees, "Efficient and Timely Mutual Authentication", The ANSA Project, 24 Hills Road, Cambridge CB21JP United Kingdom, pp. 8-10.

(Continued)

*Primary Examiner* — Abdullahi Salad
(74) *Attorney, Agent, or Firm* — Foley & Lardner LLP; Christopher J. McKenna

(57) ABSTRACT

Server state objects are identified by an intermediate server among packets transmitted between an application server and a client device on a network based upon a stateless communication protocol, by monitoring and analyzing the packets transmitted between the application server and the client device. The packets are parsed into a plurality of name-value pairs. The entropy of the name-value pairs having a same name field is computed, and candidate data objects that are likely to be server state objects are selected based upon the computed entropy. Candidate data objects that were transmitted bi-directionally between the application server and the client device are identified as server state objects.

20 Claims, 4 Drawing Sheets

(56) References Cited

OTHER PUBLICATIONS

Examination Report under Section 18 (3), Application No. GB 9925678.6, 3 pgs.
Final Office Action for U.S. Appl. No. 10/877,362 mailed Apr. 18, 2007.
International Search Authority of PCT/US05/20919.
Lawrence C. Paulson, "Mechanized Proofs for a Recursive Authentication Protocol" Computer Laboratory, University of Cambridge, Pembroke Street, Cambridge CB2 3QG, England, pp. 84-94.
Li Gong, "Using One-Way Functions for Authentication" University of Cambridge Computer Laboratory, Cambridge CB2 3QG, England Jul. 1989, pp. 8-11.
Non-Final Office Action for U.S. Appl. No. 10/877,362 mailed Jan. 20, 2011.
Non-Final Office Action for U.S. Appl. No. 10/877,362 mailed Oct. 20, 2006.
Notice of Allowance for U.S. Appl. No. 10/877,362 mailed Jun. 24, 2011.
Notice of grant of Patent right for CN appl. 2005800284905 dated Apr. 3, 2009.
Office Action for CN appl. 2005800284905 dated Jul. 4, 2008.
Office Action for JP appl. 2007-518111 dated Sep. 10, 2010.
P.Y.A. Ryan, S.A. Schneider, "An attack on a recursive authentication protocol; A cautionary tale" Information Proceesing Letters 65, 1998 Elsevier Science, B.V., pp. 7-10.
Written Opinion of PCTUS0520919.
European Supplementary Search Report on 05762116.1 dated Feb. 18, 2013.

* cited by examiner

303

302 304

| Name | Value (Attribute) |
|---|---|
| Order ID 305 | ABCDEFABCDEF |
| . . . | . . . |
| Author 306 | John |
| Order ID 305 | 111BBCCCDDD |
| Account No. 307 | 123456789 |
| . . . | . . . |
| Title 308 | Internet Sales |
| Order ID 305 | DDDCCC1112233 |

FIG. 3

INFERRING SERVER STATE IN A STATELESS COMMUNICATION PROTOCOL

RELATED APPLICATIONS

The present application is a continuation of and claims priority to U.S. patent application Ser. No 10/877,362, entitled "Inferring Server State in a Stateless Communication Protocol", filed Jun. 25, 2004, which is incorporated herein by reference in its entirety for all purposes.

TECHNICAL FIELD

The present invention relates generally to a stateless communication protocol, and more specifically, to identifying server state objects among packets transmitted between a server and a client device under a stateless communication protocol such as XML (Extensive Markup Language) or SOAP (Simple Object Access Protocol).

BACKGROUND OF THE INVENTION

Stateless communication protocols such as HTTP (Hypertext Transfer Protocol), XML, or SOAP execute each command independently, without maintaining any state information of previous commands. As such, in a strictly stateless protocol, a server will not store the identity of a client device that previously communicated with the server, and thus will not process a current transaction of the client in light of previous transactions.

Server state objects such as cookies or hidden fields are thus commonly used to identify a client device communicating with a server using a stateless communication protocol. For example, a cookie is a server state object that allows the server web site to store its own information about the client device on the client device so that the server web site can later determine the identity of the client device. Thus, a server can determine that a client device is has previous communicated with the server by examining the server state objects, and allow the client device to transact with the server based upon the established identity without additional efforts to identify the client device.

Since server state objects identify a client device to a server and allows the client device to communicate with the server based upon the determined identity, the server should have a way to protect itself from fraudulent attempts to assume a certain identity of the client device. Thus, server state objects are typically immutable under stateless communication protocols in order to prevent the server from such fraudulent attempts. That is, when the server sends a server state object to the client device, the server expects the same server state object to come back without being changed or tampered on the client device.

Under a structured, well-defined communication protocol such as HTTP, an intermediate server, such as a firewall, gateway, or application proxy, may easily identify a server state object among the packets transmitted between an application server and the client device, because the packets containing the server state objects are configured to include certain fields that identify such server state objects. For example, a cookie includes a string such as <set-cookie: . . . > and a hidden field includes a string such as <input type=hidden . . . >, which can be readily identified by the intermediate server.

However, in less structured stateless communication protocols such as XML or SOAP, an intermediate server cannot readily identify server state objects, because these protocols are designed to allow application designers to define their own objects arbitrarily. Intermediate servers, such as firewalls, typically do not have access to the protocol definition given in the application server by the application designers, and thus server state objects arbitrarily defined by the application designers cannot be readily identified by the intermediate server. For example, in one application server, a server state could be held in an "ACCOUNT NUMBER" object while in another application the same server state could be held in a "CLIENT ID" object. The application server would have access to these protocol definitions and thus can identify these server state objects. However, the intermediate server (firewall or other filter) will not have the protocol/application definition of all applications behind the intermediate server.

Therefore, there is a need for identifying, by an intermediate server, server state objects transmitted between a server and a client device under a less structured stateless communication protocol such as XML or SOAP that does not have a predefined way of identifying the server state objects.

SUMMARY OF THE INVENTION

The present invention provides for identifying server state objects among packets transmitted between an application server and a client device on a network based upon a stateless communication protocol, where the are packets received by an intermediate server that does not have access to the protocol definition used by the client device and the application server. The packets transmitted between the application server and the client device are monitored by the intermediate server and parsed into a plurality of name-value pairs (data objects). The entropy of the data objects having a same name field is computed, and candidate data objects that are likely to be server state objects are selected based upon the computed entropy. In one embodiment, data objects with an entropy higher than a threshold are selected as the candidate data objects. Finally, the candidate data objects that are determined to have been transmitted bi-directionally between the application server and the client device are identified as server state objects.

In one embodiment, the entropy of the data objects is computed by concatenating the value fields of the parsed data objects that have a same name field, compressing the concatenated value fields using an entropy-based compression algorithm, and dividing the total size of the compressed concatenated value field by the total number of data objects having that same name field.

The embodiments of the present invention can identify server state objects that were transmitted between an application server and a client device even when a less structured stateless communication protocol such as XML or SOAP is used. Thus, an intermediate server can identify a client device that previously communicated with the application server by examining the identified server state objects, without having any access to the underlying application protocol used by the application server and the client. This enables the underlying application protocols to be modified, or new applications to be hosted on the network, without having to continually update information held by the intermediate server. This also facilitates the implementation of Internet transactions using such less structured stateless communication protocols.

BRIEF DESCRIPTION OF THE DRAWINGS

FIG. 3 is a diagram illustrating the name-value pairs.

DETAILED DESCRIPTION OF EMBODIMENTS

Figure 1:
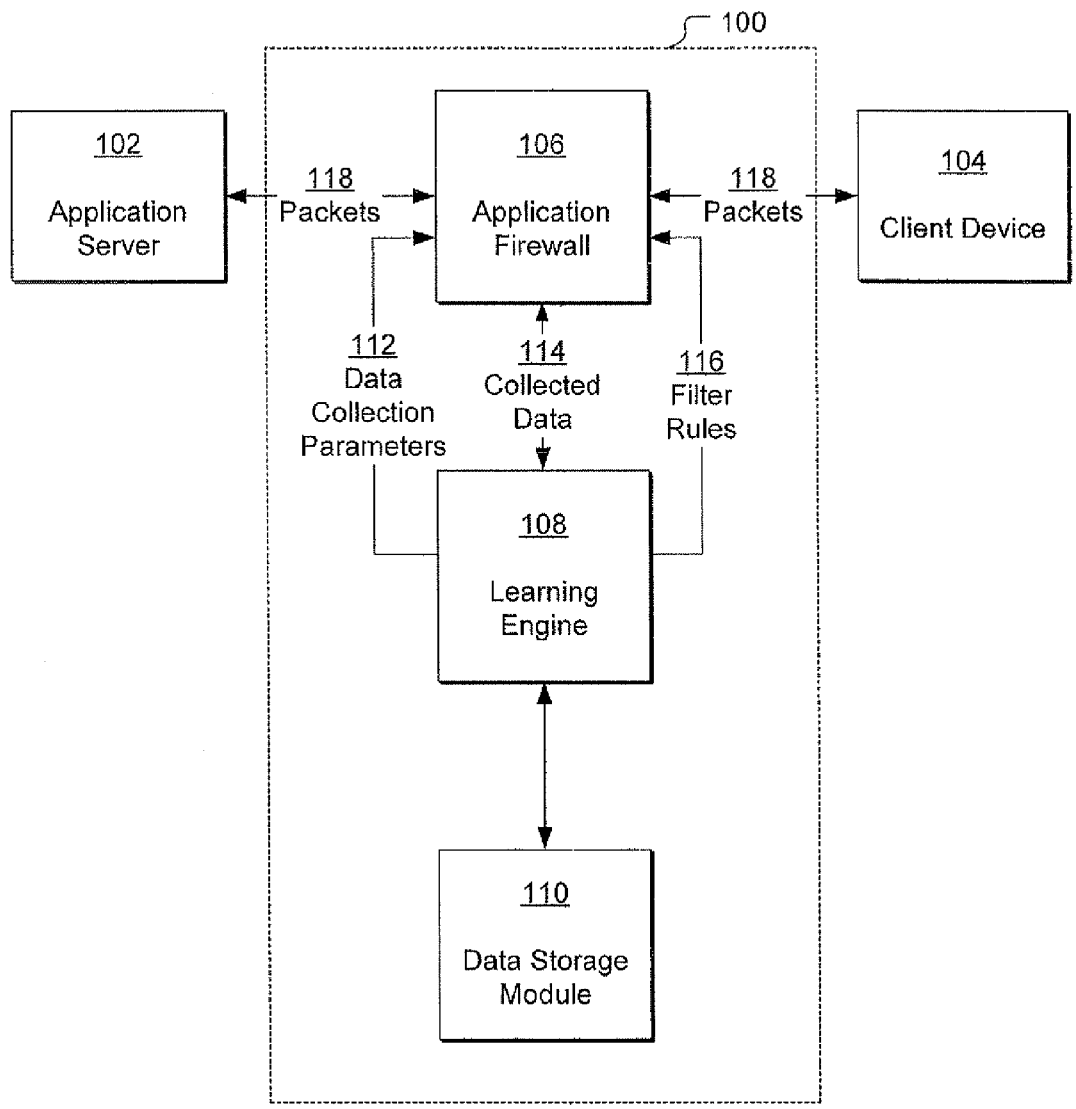
FIG. 1 is a block diagram illustrating the architecture of a system for identifying server state objects, according to one embodiment of the present invention.

FIG. 1 is a block diagram illustrating the architecture of a system 100 for identifying server state objects according to one embodiment of the present invention. The system 100 is coupled between an application server 102 and a client device 104 to monitor packets 118 transmitted between the server 102 and the client device 104. The packets 118 may be transmitted bi-directionally between the application server 102 and the client device 104, or only in a single direction from the application server 102 to the client device 104 or vice versa. The packets 118 are transmitted between the application server 102 and the client device using a stateless data communication protocol, such as XML, SOAP, or HTTP. However, the system 100 typically does not have the protocol definition given by the application server 106 by which to analyze the packets to identify server state objects. Although one client device 104 is shown in FIG. 1, it should be noted that in practice there will be numerous client devices 104 communicating with the application server 102. Also, while only a single application server 102 is shown, any number of application servers 102 may be deployed behind the system 100 to service the client devices 104.

In one embodiment, the system 100 includes an application firewall 106, a learning engine 108, and a data storage module 110. The application firewall 106 monitors the packets 118 transmitted from the server 102 to the client device 104 and from the client device 104 to the server 102. The application firewall 106 parses the monitored packets 118 and filters malicious or undesirable packets 118 according to the filtering rules 116 provided by the learning engine 108. The filtering rules 116 provide the application firewall 106 with the criteria to pass through or block certain packets 118 transmitted between the server 102 and the client device 104.

The application firewall 106 also parses the monitored packets 118 and provides the learning engine 108 with data 114 collected according to the data collection parameters 112 provided by the learning engine 108. The data collection parameters 112 provide the application firewall 106 with criteria on the type of data that the application firewall 106 should collect from the monitored packets 118. These data collection parameters 112 include, for example, how to parse the packets 118 to collect name-value (name-attribute) pairs corresponding to the packets 118 according to the communication protocol. However, in the typical embodiment, the application firewall 106 will not have access to the underlying protocol definition (e.g., a document type definition (DTD)) as used by the application server 104

In one embodiment, the application firewall 106 itself may be a computer system running software dedicated for the application firewall functions. In another embodiment, the application firewall 106 may be a software module that is part of a large software system running on a computer system 100.

The learning engine 108 provides the filtering rules 116 and the data collection parameters 112 to the application firewall 106, and receives the data 114 collected by the application firewall 106 according to the data collection parameters 112. The packets 118 are those that are transmitted between the server 102 and the client device 104 according to the employed communication protocol. For example, the packets 118 may also be XML packets or SOAP packets. The application firewall 106 parses the packets 118 into name-value (name-attribute) pairs 114, and the learning engine 108 receives these name-value pairs 114 for further processing to identify a server state object among the packets 118. The name-value (name-attribute) pairs are also referred to herein as "data objects."

The learning engine 108 identifies server state objects among the packets 118 transmitted between the server 102 and the client device 104 by analyzing the data objects 114 or name-value pairs 114 received from the application firewall 106. In this regard, the learning engine 108 identifies the name-value pairs 114, and for each identified name field, concatenates the values for that name. After accumulation of a minimum number of values for each name, the learning engine 108 then compresses the concatenated values for that name using a compression algorithm. The compression algorithm may be an entropy-based compression algorithm such as a Lempel-Ziv type compression algorithm. Then, the learning engine 108 computes the entropy of each of the compressed values by dividing the total size of the compressed values by the total number of values having that same name.

The learning engine 108 selects candidate data objects that are likely to be server state objects from the data objects according to their computed entropies. Since server state objects typically contain relatively distinct strings in their value fields in order to maintain the state of each client, the entropies of server state objects are likely to be high. Thus, in one embodiment, the learning engine 108 selects data objects having an entropy value higher than a threshold value as the candidate data objects. The threshold value for the entropy differs depending upon the underlying communication protocol used for transmission of the packets 118. A typical server state object has an entropy value corresponding to 32 bits or more, since it is often an object reference into the server implementation or a key in a database table. Thus, in one embodiment, the threshold value is set at an entropy level corresponding to 24 bits.

The learning engine 108 identifies one or more of the candidate data objects as server state objects if the candidate data object was transmitted both from the application server 102 to the client device 104 and from the client device 104 to the application server 102. This is because a server state object would have been sent by the application server 102 to the client device 104 and stored in the client device 104 so that the application server 102 can later identify the client device 104, and also sent from the client device 104 to the application server 102 later on so that the client device 104 can identify itself to the application server 102.

In one embodiment, the learning engine 108 identifies candidate data objects that were bi-directionally transmitted between the server 102 and the client device 104 by dividing related packets under the communication protocol into a first group of packets that were transmitted from the server to the client device and a second group of packets that were transmitted from the client device to the server. Related packets are packets that correspond to a "related message" under the communication protocol. For example, packets that form a part of a request/response communication of an HTTP session are related packets under the HTTP protocol. In SOAP, requests and responses may be carried out in separate connections. Therefore, the notion of related packets under SOAP is externally provided. In one embodiment, messages between the same source and destination points (based upon source IP address/port and destination IP address/port) may be considered related packets under SOAP. In other embodiments, messages between two same services (identified by the URL (Uniform Resource Locator)) are considered related packets under SOAP. The learning engine 108 identifies the candidate data objects included in both the first group of packets and the second group of packets as server state objects.

In one embodiment, the data storage module 110 may temporarily store the collected data 114 and other interim data, while the learning engine 108 analyzes the collected data 114 in real time as the data objects 114 are received from the application firewall 106 to identify the server state objects among the packets 118. In another embodiment, the storage module 110 stores the received data objects in the collected data 114 for a predetermined period of time or until the amount of the stored data objects reach a certain threshold, and the learning engine 108 processes the stored data objects in batches to determine whether the data objects are server state objects.

Figure 2:
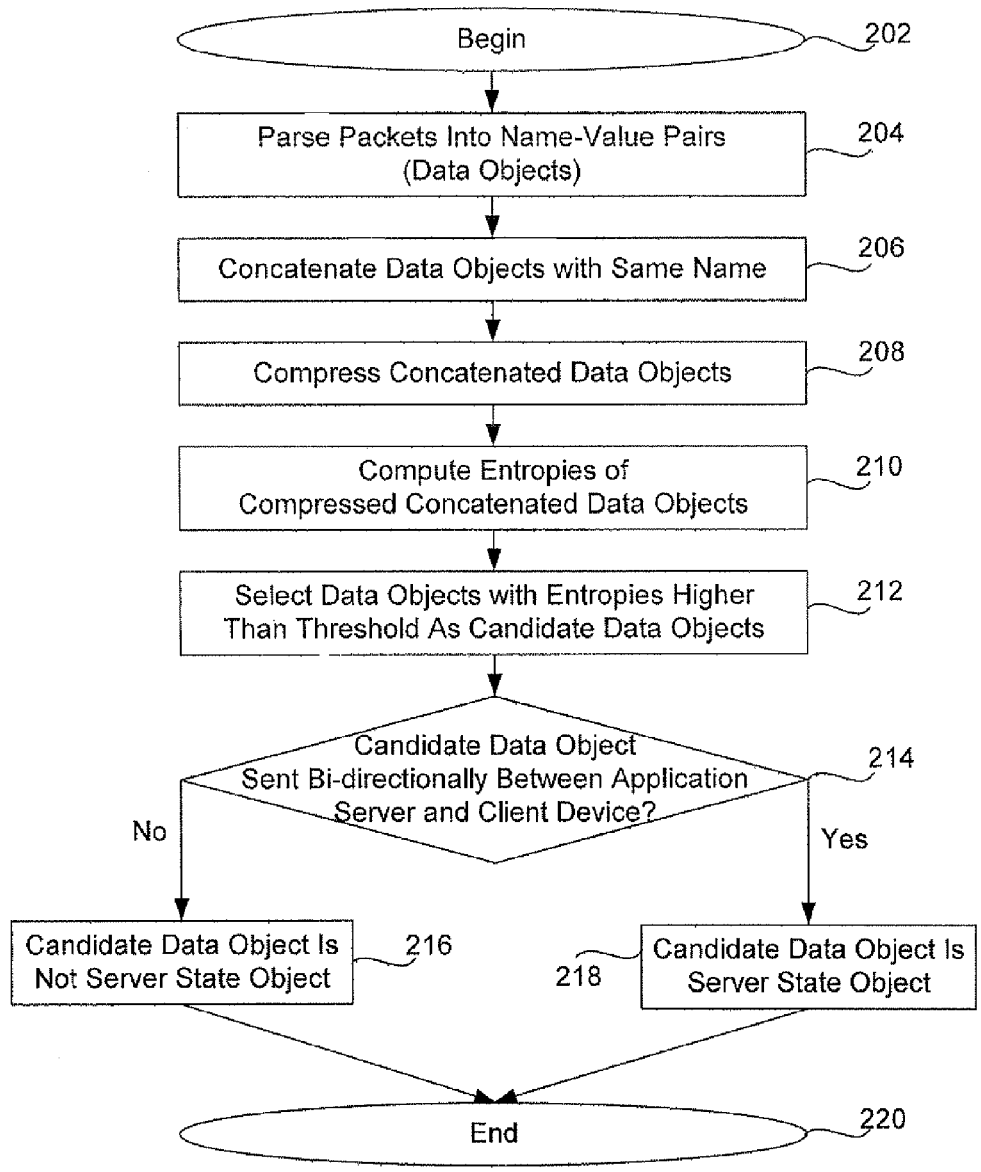
FIG. 2 is a flowchart illustrating a method for identifying server state objects, according to one embodiment of the present invention.

FIG. 2 is a flowchart illustrating a method for identifying server state objects among packets 118 transmitted between a server 102 and a client device 104 on a network based upon a stateless communication protocol, according to one embodiment of the present invention. The method described in FIG. 2 may be performed in the system 100 of FIG. 1.

As the method begins 202, the application firewall 106 parses 204 the packets 118 transmitted from the server 102 to the client device 104 or from the client device 104 to the server 102 into a plurality of name-value pairs (data objects). FIG. 3 describes examples of name-value pairs 303. Referring to FIG. 3, the packets 118 are parsed and divided into names 302 and values (attributes) 304 corresponding to the names 302. For example, the name "Order ID" 305 may be a name corresponding to Internet sales transactions performed between the server web site 102 and the client device 104. These name fields "Order ID" 305 have corresponding value fields "ABCDEFABCDEF," "111BBCCCDDD," and "DDDCCC1112233." The name fields "Author" 306, "Account No." 307, and "Title" 308 have corresponding value fields "John," "123456789," and "Internet Sales," respectively. While FIG. 3 only shows three name-value pairs 303, in practice there can be hundreds, or even thousands of name-value pairs 303 maintained by the application firewall 106 at any given time.

Referring back to FIG. 2, the learning engine 108 concatenates 206 the value fields of the parsed data objects having the same name field. For example, some of the name-value pairs in FIG. 3 have same names "Order ID" 305. Thus, the value fields 304 corresponding to the name "Order ID" are concatenated to obtain a concatenated value "ABCDEFABCDEF111BBCCCDDDDDDCCC1112233" corresponding to the name field "Order ID" 305.

After a minimum number of name-value pairs for any given name have been identified, the learning engine 108 compresses 208 the concatenated values for that name using a compression algorithm. In one embodiment, the compression algorithm may be an entropy-based compression algorithm such as a Lempel-Ziv type compression algorithm. Then, the learning engine 108 computes 210 the entropy of the compressed concatenated values by dividing the total size of the compressed concatenated value list by the total number of name-value pairs for that name. Therefore, in the example shown in FIG. 3, the concatenated value list "ABCDEFABCDEF111BBCCCDDDDDDCCC1112233" is compressed 208 using a compression algorithm, and the total size of the compressed concatenated values is divided by the number (three in the example of FIG. 3) of name-value pairs having the same name field ("Order ID").

As is apparent, there will be numerous data objects that are potential candidates for being server state objects, and for each of these candidates there will be a computed entropy measure. From this set of potential candidates, the learning engine 108 selects 212 candidate name-value pairs that are likely to be server state objects according to the computed entropies. As stated previously, in one embodiment, the learning engine 108 selects the name-value pairs having an entropy measure that is higher than a predetermined threshold as the candidate name-value pairs. The threshold value for the entropy differs depending upon the underlying communication protocol used for transmission of the packets 118. A typical server state object has an entropy value corresponding to 32 bits or more, since it is often an object reference into the server implementation or a key in a database table. Thus, in one embodiment, the threshold value is set at an entropy level corresponding to 24 bits. Thus, in the foregoing, "Order ID" and "Account No." may be selected as having sufficiently high entropy, while "Author" and "Title" may not.

Then, the learning engine 108 determines 214 which of the candidate name-value pairs have been sent bi-directionally between the application server 102 and the client device 104. If the candidate name-value pair was sent bi-directionally, the learning engine 108 labels 218 that the candidate name-value pair as a server state object. If the name-value pair was not sent bi-directionally, the learning engine 108 determines 216 that the candidate name-value pair is not a server state object.

Figure 4:
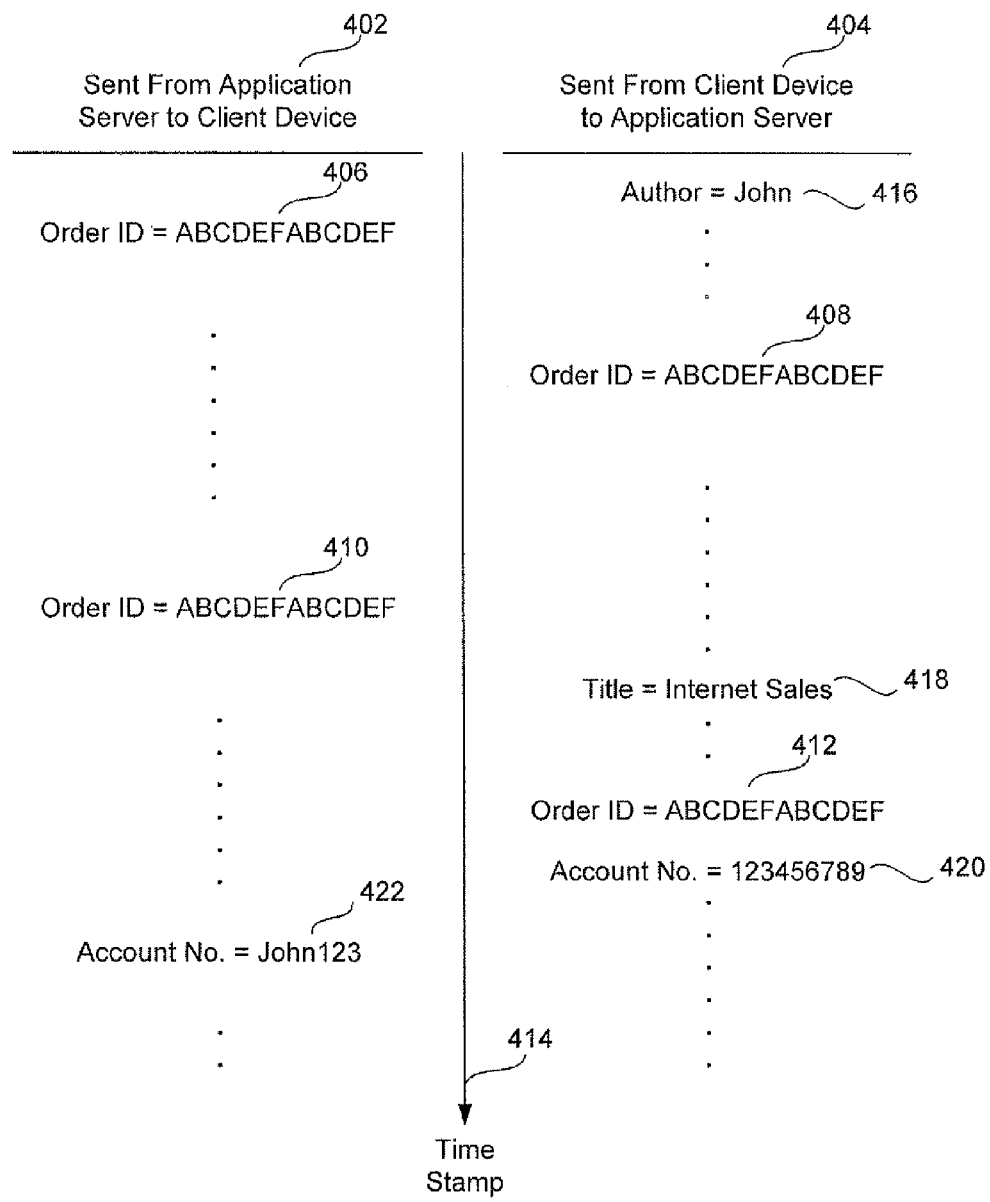
FIG. 4 is diagram illustrating the step of identifying name-value pair transmitted bi-directionally between the server and the client device.

FIG. 4 is illustrates the process of identifying a name-value pair transmitted bi-directionally between the server and the client device as described in FIG. 2. As stated previously, the learning engine 108 identifies one or more of the candidate name-value pairs as server state objects if the candidate name-value pair was transmitted bi-directionally between the application server 102 and the client device 104. This is because a server state object would have been sent by the application server 102 to the client device 104 and stored in the client device 104 so that the application server 102 can later identify the client device 104, and also sent from the client device 104 to the application server 102 later on so that the client device 104 can identify itself to the application server 102.

Referring to FIG. 4, in one embodiment, the learning engine 108 divides related packets under the communication protocol into a first group 402 of packets that were transmitted from the application server 102 to the client device 104 and a second group 404 of packets that were transmitted from the client device 104 to the application server 102 in sequential order of their associated time-stamp indicating the receipt of the corresponding packets 118 by the application firewall 106. Related packets are packets that correspond to a related message under the communication protocol. For example, packets that form parts of a request/response of an HTTP session are related packets under the HTTP protocol. In SOAP, requests and responses may be carried out in separate connections. Therefore, the notion of related packets under SOAP is externally provided. In one embodiment, messages between the same source and destination points (based upon source IP address/port and destination IP address/port) may be considered related packets under SOAP. In other embodiments, messages between two same services (identified by the URL (Uniform Resource Locator)) are considered related packets under SOAP. In the example shown in FIG. 4, the name-value pairs 406, 408, 410, and 412 are candidate name-value pairs that were transmitted bi-directionally between the application server 102 and the client device 104. It should noted that there may also be additional candidate name-value pairs other than the candidate name-value pairs 406, 408, 410, 412, although they are not shown in FIG. 4.

The learning engine 108 identifies the name-value pairs included in both the first group 402 of packets and the second group 404 of packets as server state objects. For example, the candidate name-value pairs 406, 408, 410, 412, 420, 422 are included in both the first group 402 of packets and the second group 404 of packets and determined to be server state objects by the learning engine 108. However, the candidate name-value pairs 416 and 418 are included in only the second group 404 of packets and thus are not server state objects.

The present invention has the advantage that server state objects transmitted between an application server and a client device may be identified by an intermediate server, such as a filter or a gateway, even when a less structured stateless data communication protocol such as XML or SOAP is used, where the intermediate server does not have access to the underlying application protocol. This facilitates the implementation of Internet transactions using such less structured stateless data communication protocols, because a server can identify a client device that previously communicated with the server by examining the server state objects.

Although the present invention has been described above with respect to several embodiments, various modifications can be made within the scope of the present invention. For example, the present invention is not limited to any communication protocol and may be used with any stateless communication protocol. The architecture of the system 100 of FIG. 1 is merely exemplary and may be modified in any way to the extent that the system 100 may monitor the packets transmitted bi-directionally between the application server 102 and the client device 104. Compression of the value fields of the data objects may be done using any type of compression algorithm, and the method of calculating the entropy of the concatenated compressed data objects is not limited to what is described herein. The method of identifying bi-directional packets is not limited to what is described herein in FIG. 4, and different methods may be used as long as they are suitable for identifying packets bi-directionally transmitted between the application server 102 and the client device. The present invention may also be used to identify server state objects when a plurality of client devices 104 communicate with the application server 102 or when the client device 104 communicates with a plurality of application servers 102.

Accordingly, the disclosure of the present invention is intended to be illustrative, but not limiting, of the scope of the invention, which is set forth in the following claims.

What is claimed is:

1. A method for identifying server state objects among packets transmitted between a server and a client on a network based upon a communication protocol, the method comprising:
computing, by a device intermediary to a client and a server, entropy measures for a plurality of data objects in packets transmitted between the client and the server, based on a size of the data objects after compression, for comparison against a threshold, the threshold predetermined based on a communication protocol for transmitting the packets; and
identifying, by the device, at least one of the data objects as a server state object in response to the at least one data object (i) being transmitted bi-directionally between the server and the client and (ii) having a computed entropy measure higher than the threshold.

2. The method of claim 1, wherein each data object comprises a value field corresponding to a name field.

3. The method of claim 1, further comprising compressing the data objects.

4. The method of claim 3, wherein compressing the data objects comprises compressing the data objects using an entropy-based compression algorithm.

5. The method of claim 1, wherein the plurality of data packets are transmitted using a communications protocol comprising one of: Extensible Markup Language (XML), Simple Object Access Protocol (SOAP) and Hypertext Transfer Protocol (HTTP).

6. The method of claim 1, wherein the at least one data object is determined to have been transmitted bi-directionally between the server and the client by:
dividing related packets into a first group of packets that were transmitted from the server to the client and a second group of packets that were transmitted from the client to the server; and
determining whether the at least one data object is included in both the first group of packets and the second group of packets.

7. The method of claim 6, wherein the related packets are packets that correspond to a related message under a communication protocol.

8. A method for identifying server state objects among packets transmitted between a server and a client on a network based upon a communication protocol, the method comprising:
parsing, by a device intermediary to a client and a server, packets transmitted between the client and the server into a plurality of data objects;
computing, by the device, the entropies of the data objects based on a size of the data objects after compression, for comparison against a threshold, the threshold predetermined based on a communication protocol for transmitting the packets; and
determining that at least one of the data objects is a server state object in response to determining that the at least one data objects (i) was sent bi-directionally between the server and the client and (ii) has a computed entropy measure higher than the threshold.

9. The method of claim 8, wherein each data objects comprises a value field and a name field.

10. The method of claim 8, wherein the plurality of packets are transmitted using a communications protocol comprising one of: Extensible Markup Language (XML), Simple Object Access Protocol (SOAP) and Hypertext Transfer Protocol (HTTP).

11. The method of claim 8, further comprising compressing the data objects with an entropy-based compression algorithm.

12. The method of claim 8, wherein the data packets are transmitted using a stateless communications protocol.

13. The method of claim 8, wherein determining whether the data objects were sent bi-directionally between the server and the client comprises:
dividing related packets into a first group of packets that were transmitted from the server to the client and a second group of packets that were transmitted from the client to the server; and
determining whether the data objects are included in both the first group of packets and the second group of packets.

14. The method of claim 13, wherein the related packets are packets that correspond to a related message under a communication protocol.

15. A system for identifying server state objects among packets transmitted between a server and a client on a network based upon a communication protocol, the system comprising:
- a device intermediary to a server and a client;
- a parsing module of the device parsing packets transmitted between the server and the client into a plurality of data objects; and
- an analysis module of the device receiving the data objects and determining whether the name-value pairs are server state objects by: computing entropy measures of the data objects based on a size of the data objects after compression, for comparison against a threshold, the threshold predetermined based on a communication protocol for transmitting the packets; and identifying at least one of the data objects as a server state object in response to the at least one data object (i) being transmitted bi-directionally between the server and the client and (ii) having a computed entropy measure higher than the threshold.

16. The system of claim 15, wherein the parsing module operates as a firewall filtering the packets transmitted between the server and the client in accordance with rules provided by the analysis module.

17. The system of claim 15, wherein the parsing module collects data regarding the packets transmitted between the server and the client in accordance with data collection parameters provided by the analysis module.

18. The system of claim 15, wherein the analysis module processes the data objects to determine whether the data objects are server state objects in real time as the data objects are received from the parsing module.

19. The system of claim 15, further comprising a storage module coupled to the analysis module, the analysis module storing the received data objects in the storage module and processing the stored data objects in batches to determine whether the data objects are server state objects.

20. The system of claim 15, wherein each data object comprises a value field corresponding to a name field.

* * * * *